United States Patent
Yoo et al.

(10) Patent No.: US 8,993,043 B2
(45) Date of Patent: Mar. 31, 2015

(54) METHOD FOR FABRICATING COLOR FILTER LAYER OF LIQUID CRYSTAL DISPLAY DEVICE AND METHOD FOR FABRICATING LIQUID CRYSTAL DISPLAY DEVICE USING THE SAME

(75) Inventors: Soon-Sung Yoo, Gyeonggi-Do (KR); Duk-Chul Yun, Seoul (KR); Oh-Nam Kwon, Gyeonggi-do (KR); Youn-Gyoung Chang, Gyeonggi-do (KR); Heung-Lyul Cho, Gyeonggi-do (KR); Seung-Hee Nam, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1912 days.

(21) Appl. No.: 11/478,297

(22) Filed: Jun. 29, 2006

(65) Prior Publication Data
US 2007/0153166 A1 Jul. 5, 2007

(30) Foreign Application Priority Data
Dec. 30, 2005 (KR) .......................... 10-2005-0136171

(51) Int. Cl.
B05D 5/00 (2006.01)
G02F 1/1335 (2006.01)
G02B 5/20 (2006.01)

(52) U.S. Cl.
CPC .......... *G02F 1/133516* (2013.01); *G02B 5/201* (2013.01); *G02F 1/133512* (2013.01)
USPC .......................................................... 427/66

(58) Field of Classification Search
USPC .......................................................... 427/68
See application file for complete search history.

(56) References Cited

U.S. PATENT DOCUMENTS

| | | | | |
|---|---|---|---|---|
| 5,880,803 A | * | 3/1999 | Tamai et al. | 349/156 |
| 6,035,526 A | * | 3/2000 | Saruta et al. | 29/846 |
| 6,358,602 B1 | * | 3/2002 | Horiuchi et al. | 428/323 |
| 6,593,992 B1 | * | 7/2003 | Chin et al. | 349/153 |
| 6,677,243 B2 | * | 1/2004 | Okada et al. | 438/706 |
| 7,183,023 B2 | * | 2/2007 | Sonehara et al. | 430/7 |
| 2004/0197682 A1 | | 10/2004 | Sonehara et al. | |
| 2005/0083478 A1 | * | 4/2005 | Lee et al. | 349/156 |
| 2005/0134764 A1 | * | 6/2005 | Jeoung et al. | 349/110 |

FOREIGN PATENT DOCUMENTS

| | | |
|---|---|---|
| CN | 1336567 | 2/2002 |
| CN | 1492265 | 4/2004 |
| CN | 1657981 A | 8/2005 |
| TW | 278395 B | 4/2007 |

OTHER PUBLICATIONS

First Office Action issued in corresponding Chinese Patent Application No. 200610095972.9; issued Mar. 7, 2008.
Office Action issued in corresponding Taiwanese Patent Application No. 095123432; issued Dec. 16, 2009.
Office Action issued in corresponding Korean Patent Application No. 10-2005-0136171, mailed Jul. 31, 2012.

* cited by examiner

*Primary Examiner* — Robert Vetere
(74) *Attorney, Agent, or Firm* — Brinks Gilson & Lione

(57) ABSTRACT

A method for fabricating color filter layer of an LCD comprises forming a plurality of black matrixes separated at certain intervals on a color filter substrate, and forming R, G and B color filter layers by using a plurality of needles between the plurality of black matrixes on the color filter substrate.

5 Claims, 4 Drawing Sheets

METHOD FOR FABRICATING COLOR FILTER LAYER OF LIQUID CRYSTAL DISPLAY DEVICE AND METHOD FOR FABRICATING LIQUID CRYSTAL DISPLAY DEVICE USING THE SAME

The present application claims the benefit of Korean Patent Application No. 136171/2005 filed in Korea on Dec. 30, 2005, which is hereby incorporated by reference.

FIELD

The present invention relates to a method for fabricating a liquid crystal display (LCD) device and, more particularly, to a method for fabricating an LCD capable of reducing a fabrication cost of color pixels of the LCD by fabricating color filters for implementing red, green and blue pixels by transferring color pigment through a needle between black matrixes of a color filter substrate, and a method for fabricating an LCD device using the same.

BACKGROUND

In general, an LCD device using thin film transistors (TFTs) as switching elements implements colors through operations of thin film transistors (TFTs) and liquid crystal cells that control a transmission rate of white color emitted from a backlight and through additive mixture of three colors transmitted through color filters including R, G and B.

Herein, as for the color filters, which apparently looks like a general element plate, flat panel matrixes are formed on a glass substrate and R, G and B filter layers with excellent light transmittance are formed therebetween.

A shape, dimension and color arrangement of the color filters differ according to the purpose of an LCD. In other words, the arrangement of color filters includes a strip arrangement, a mosaic arrangement and a delta arrangement.

Actually, in the color filters, R, G and B pixels are connected with TFTs in a one-to-one manner on a liquid crystal panel. As the requirements for the color filters, first, color filters are to have high coloration density, high light transmittance, second, they are not to have a color change or discoloration with respect to a backlight, and third, they are to be chemically stable and harmless to a liquid crystal material.

A general color filter structure and types of its fabricating methods will be described. Although not shown, in general, a black matrix is formed on a glass substrate or the like, and R, G and B color filter layers are formed to partially overlap with the black matrixes between the black matrixes. A passivation film is formed to protect the color filter layers, on which a common electrode is formed as a transparent electrode.

The black matrixes are generally positioned between the R, G and B patterns of the color filter in order to shield a portion where a pixel electrode is not formed and reverse tilted domains.

The black matrix also serves to prevent an increase in a leakage current by blocking direct light irradiation on the TFT used as a switching element.

The color filter is fabricated by a dye method and a pigment method depending on an organic filter, and the fabrication can be classified into a dyeing method, a distribution method, an electrodeposition method and printing method. The fabrication method of the color filter will be described as follows.

First, the printing method is to fabricate color filters by printing R, G and B ink on a substrate through several printing methods. A typical printing method includes a screen printing, an offset printing, etc. Since the printing method is simple, it can be used for mass-production, and a material with a high heat resistance or light resistance can be used. But the printing method has disadvantages in that a pinhole due to an air bubble, spreading of color density, discoloration can be easily generated, and perpendicularity at an edge of a pattern can be degraded due to a leakage of ink during printing process.

The electrodeposition method is to form a colorant layer by depositing coloring matter on an electrode. According to this method, a polymer resin and coloration pigment are dissolved or dispersed in an electrolyte solvent to deposit the pigment on a surface of a transparent electrode connected to both sides and dried at a high temperature. However, the electrodeposition method has such problems that if a specific resistance of the transparent electrode is high, spreading occurs, and the transparent electrode can be damaged by a component, which causes a chemical reaction with the transparent electrode, contained in the electrolyte solvent. In particular, the transparent electrode has a low chemical resistance and thus severely influenced to be damaged, so after the electrodeposition, color density and light transmittance are degraded.

In case of the LCD using the TFTs, the pigment spreading method is generally used for fabricating the color filters. Primary components of the color filter pigment fabricated by the pigment spreading method include a photopolymerization type photosensitive composition such as a photopolymerization initiator, monomer, binder, etc., and an organic pigment implementing colors.

The process of fabricating a color filter substrate which is required to have low reflection characteristics generally includes forming black matrixes using a chrome/chromeoxide ($Cr/CrO_x$), forming color filters by the pigment spreading method, and forming a common electrode.

The related art process of fabricating the color filters of the LCD using the pigment spreading method will be described with reference to FIGS. 1a to 1e.

FIGS. 1a to 1e show sequential sectional views of a process for fabricating color filters of the related art LCD.

With reference to FIG. 1a, like a TFT array substrate, first, a substrate 10 is cleansed, and then $Cr/CrO_x$ used as a material of the black matrix is deposited on the substrate 10.

Next, the $Cr/CrO_x$ layer is selectively patterned through an exposure and development process using photolithography to form a plurality of black matrixes. In this case, formation of the black matrix 11 is directly related to an aperture ratio, so its designing must be prudent, and because $CrO_x$ is etched by a general Cr etching solution, the $Cr/CrO_x$ is simultaneously etched.

Subsequently, with reference to FIG. 1b, a red pigment is deposited entirely on the substrate including the plurality of black matrixes 11, and selectively patterned by the exposure and development process using the photolithography to form a red color filter layer 13 on a portion of the substrate 10.

And then, with reference to FIG. 1c, a green color pigment is deposited entirely on the substrate including the red color filter layer 13 and then selectively patterned by the same process as in FIG. 1b, namely, by the exposure and development process using the photolithography to form a green color filter layer 15 on a portion of the substrate 10.

Thereafter, with reference to FIG. 1d, a blue color pigment is deposited entirely on the substrate 10 including the green color filter layer 15, and then selectively patterned by the same process as in FIG. 1b, namely, by the exposure and development process using the photolithography to form a blue color filter layer 17 on a portion of the substrate 10.

And then, with reference to FIG. 1e, after the color filter layer formation process is completed, an overcoat layer 19 is deposited entirely on the substrate to planarize the surface thereof.

As mentioned above, the related art color filter fabrication method of the LCD has the following problems. That is, when the color filters are fabricated by the pigment spreading method, waste of pigment is severe. That is, in order to form the red color filter layer, the red color pigment is deposited entirely on the substrate but remain on the necessary portion (e.g., ⅓ portion) while the pigment deposited on the other portions (e.g., ⅔ portions) are removed, resulting in a waste of much pigment.

In particular, a cost for the device, process and material for forming the color pigment during the color filter fabrication is high in the fabrication cost of the color filters, so the overall color filter fabrication cost increases.

SUMMARY

A method for fabricating color filters of an LCD comprises forming a plurality of black matrixes separated at certain intervals on a color filter substrate, and forming R, G and B color filter layers by using a plurality of needles between the plurality of black matrixes on the color filter substrate.

In another aspect of the present invention, a method for fabricating an LCD comprises forming a plurality of gate lines on an array substrate, and forming a plurality of data lines to cross the plurality of gate lines on the array substrate. The method for fabricating an LCD further comprises forming thin film transistors (TFTs) at each crossing of the plurality of gate lines and the plurality of data lines, forming a plurality of black matrixes separated at certain intervals on a color filter substrate, forming R, G and B color filter layers between the plurality of black matrixes on the color filter substrate by using a plurality of needles, and forming a liquid crystal layer between the array substrate and the color filter substrate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

The method for fabricating color filter layer of an LCD and a method for fabricating an LCD using the same according to the present invention will be described with reference to the accompanying drawings.

FIGS. 2a to 2e are sequential sectional views of a process for fabricating color filters of an LCD device according to the present invention.

Figure 1A:
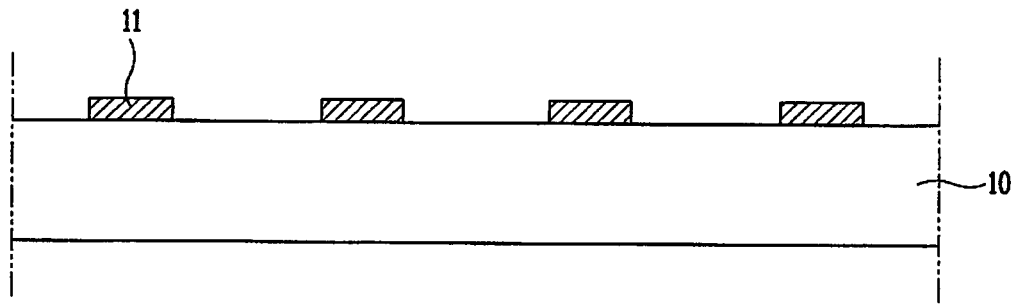
FIGS. 1a to 1e are sequential sectional views of a process for fabricating color filters of a liquid crystal display (LCD) device according to a related art.
Figure 1B:
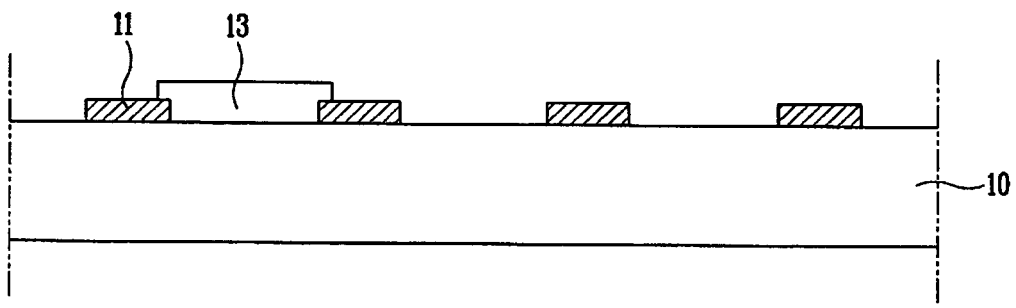
Figure 1C:
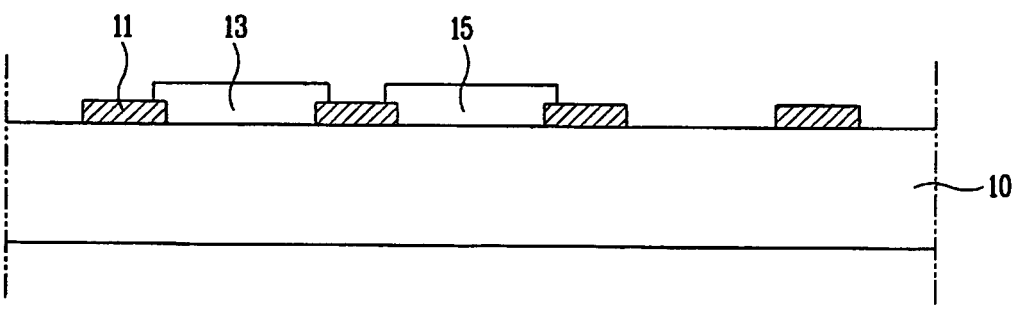
Figure 1D:
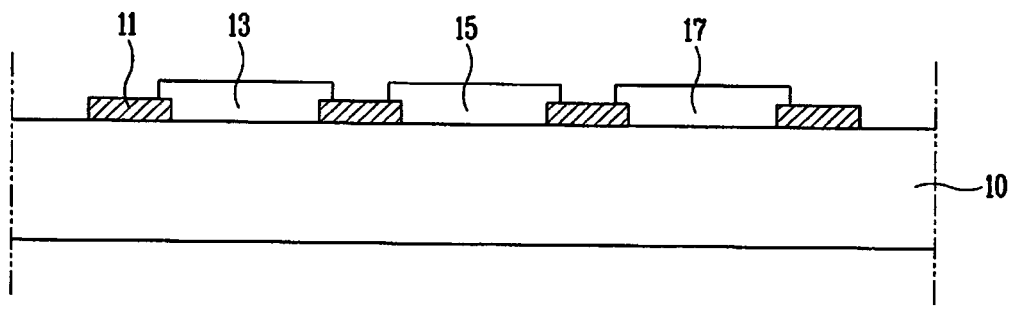
Figure 1E:
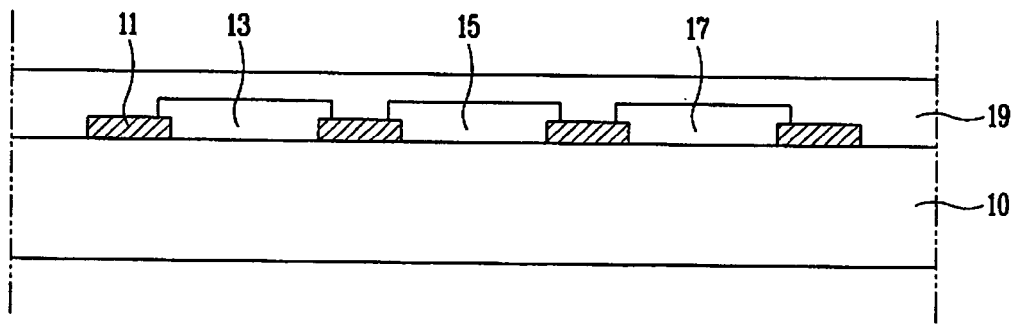
Figure 2A:
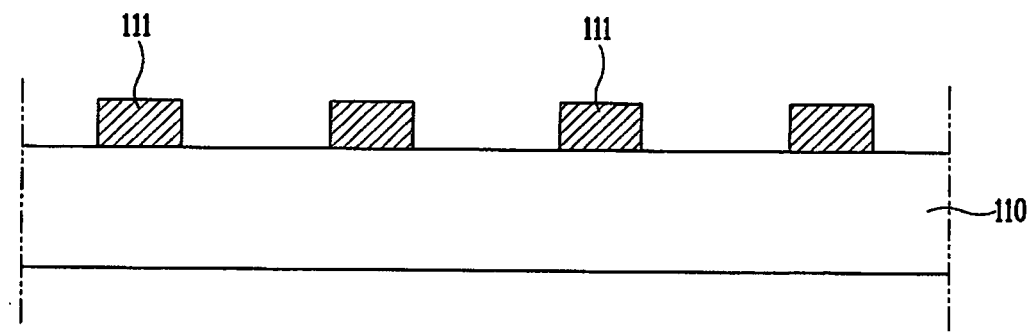
FIGS. 2a to 2e are sequential sectional views of a process for fabricating color filters of an LCD device according to the present invention.

With reference to FIG. 2a, like the TFT array substrate, first, a substrate 110 is cleansed, and then Cr/CrO$_x$ used as a material of the black matrix is deposited on the substrate 110.

Next, the Cr/CrO$_x$ layer is selectively patterned through an exposure and development process using photolithography to form a plurality of black matrixes 111 having a certain space. In this case, the black matrix also serves as a spacer. And then, R, G and B color pigments are transferred on the substrate 110 by using a large number of needles 113, 117 and 121 to form R, G and B color filter layers. In this case, the R, G and B color pigment transferring method can be different according to an arrangement of color filters such as the strip arrangement, the mosaic arrangement and the delta arrangement.

Figure 2B:
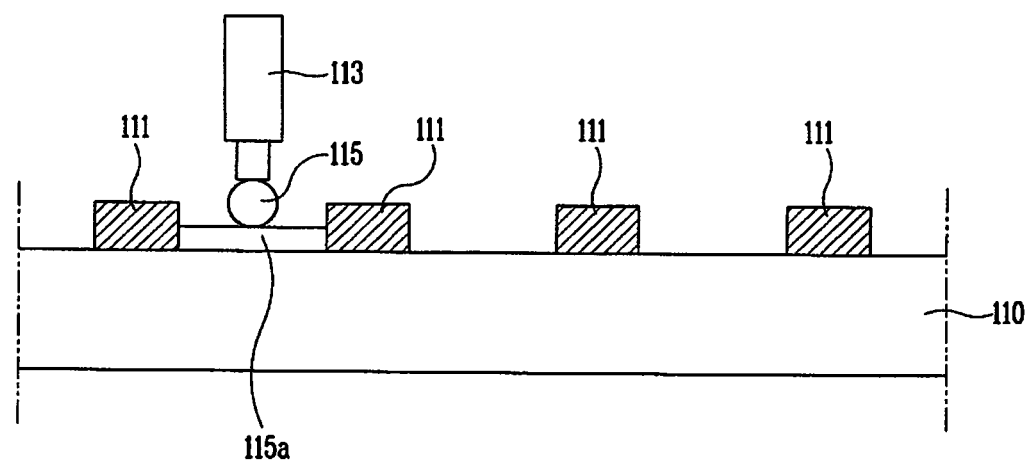

And then, with reference to FIG. 2b, a red color pigment 115 is trapped on the substrate 110, on which the plurality of black matrixes 111 have been formed, by using surface tension of the first transfer needle 113 and then transferred between the adjacent black matrixes 111 on the substrate 110 to form a red color filter layer 115a. In this case, affinity of the red color pigment to the surface of the substrate is stronger than the transfer needle 113.

Figure 2C:
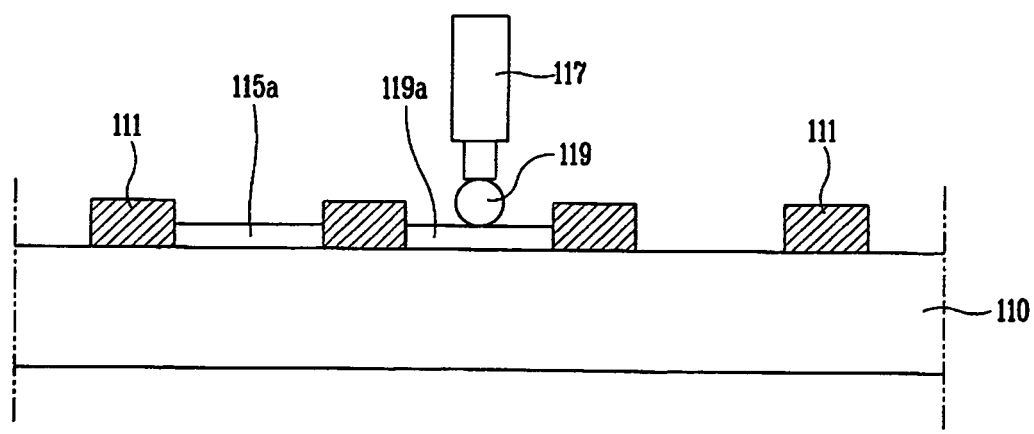

Subsequently, with reference to FIG. 2c, a green color pigment 119 is trapped on a portion of the substrate 110, on which red color filter layer 115a has been formed, by using the same method as in FIG. 2b, namely by using surface tension of the second transfer needle 117 and then transferred between the adjacent black matrixes 111 on the substrate 110 to form a green color filter layer 119a. In this case, affinity of the green color pigment to the surface of the substrate is stronger than the transfer needle 117.

Figure 2D:
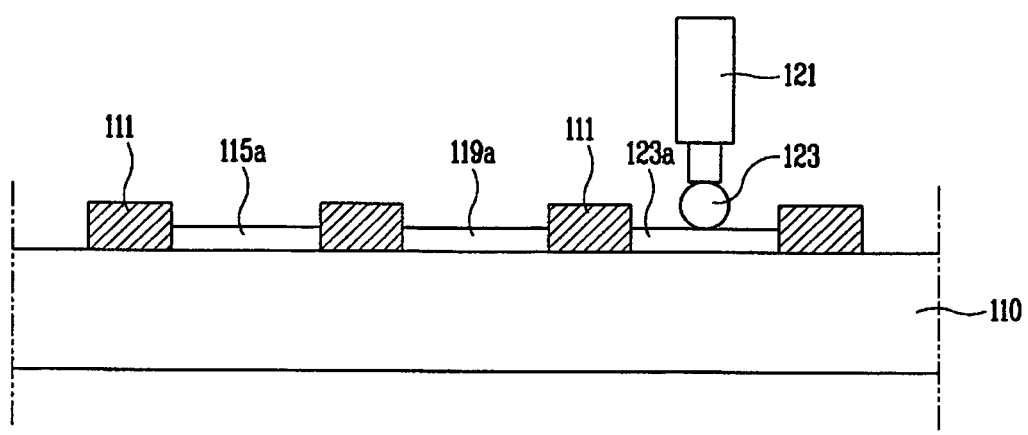
Figure 2E:
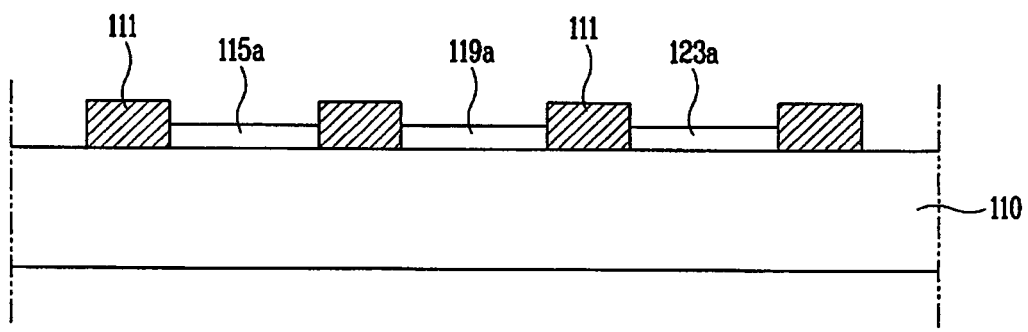

And then, with reference to FIGS. 2d and 2e, a blue color pigment 123 is trapped on another portion of the substrate 110, on which the red color filter layer 115a and the green color filter layer 119a have been formed, by using the same method as in FIG. 2b, namely, by using surface tension of the third transfer needle 121 and then transferred between the adjacent black matrixes 111 on the substrate 110 to form a blue color filter layer 123a. In this case, affinity of the blue color pigment to the surface of the substrate is stronger than the transfer needle 117. Accordingly, the R, G and B color filter layers have been completely formed as shown in FIG. 2e.

As stated above, the R, G and B color pigments have the hydrophilic radical on their surface, and the surface of the glass substrate 110 has strong hydrophilicity. Namely, the color pigments are transferred by using the surface tension of the respective needles 113, 117 and 121, and in this case, the hydrophilicity of the substrate on which the pigments have been transferred is stronger than that of the needles 113, 117 and 121. As a matter of course, the surface of the color pigments have hydrophilicity.

In a different embodiment of the present invention, the R, G and B color pigments may have hydrophobicity. In this case, the surface of the glass substrate also has hydrophobicity.

Needles transfer color pigments by using surface tension of the color pigments and the needles on the substrate. With the color pigments transferred thereon, the substrate has hydrophobicity and the needles also have hydrophobicity. As a matter of course, the surface of the color pigments has hydrophobicity.

Thereafter, although not shown on the drawing, a process for forming a common electrode (not shown) for operating liquid crystal cells together with a pixel electrode (not shown) formed on the lower TFT array substrate (not shown) is performed.

The method for fabricating an LCD by using a method for fabricating the color filter layers will be described as follows.

First, a plurality of gate lines (not shown) are formed on the array substrate (not shown).

Next, a plurality of data lines are formed to cross the plurality of gate lines on the array substrate.

Subsequently, TFTs are formed at each crossing of the plurality of gate lines and the plurality of data lines.

And then, pixel electrodes are formed to be electrically connected with the TFTs on the array substrate.

Thereafter, a plurality of black matrixes are formed to be separated at certain intervals on the color filter substrate. In this case, the black matrixes also serve as spacers.

And then, the R, G and B color filter layers are formed by using the large number of needles between the black matrixes on the substrate.

In the process of forming the R, G and B color filter layers by using the large number of needles between the black matrixes on the substrate, the R, G and B color pigments are trapped by using the surface tension of the large number of needles and then sequentially transferred onto the surface of the color filter substrate to form the R, G and B color filter layers.

In the process of trapping the R, G and B color pigments by using the surface tension of the large number of needles and sequentially transferring them onto the surface of the color filter substrate to form the R, G and B color filter layers, affinity of the color pigments to the surface of the substrate is stronger than that of the needles.

As so far described, the color filter of the LCD and the method for fabricating the LCD by using the same have the following advantages.

That is, for example, because the R, G and B color filter layers are formed by sequentially transferring the R, G and B color pigments on the color filter substrate through the needles, the fabrication process of the color filters can be simplified, the material for the color filter layers can be saved and a cost for the color filter fabrication can be lowered.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for fabricating color filter layer of an LCD comprising:
    forming a plurality of black matrixes separated at certain intervals on a color filter substrate; and
    forming R, G and B color filter layers by using a plurality of needles between the plurality of black matrixes on the color filter substrate,
    wherein forming the R, G and B color filter layers comprises:
    trapping the R, G and B color pigments by using a surface tension of the plurality of needles; and
    sequentially transferring the R, G and B color pigments onto a surface of the color filter substrate to form the R, G and B color filter layers,
    wherein each of the R, G and B color filter layers has a uniform profile height lower than a profile height of surrounding black matrixes, the black matrixes serve as a spacer to maintain a cell gap between the color filter substrate and an array substrate,
    wherein in trapping the R, G and B color pigments by using the surface tension of the plurality of needles and sequentially transferring the R, G and B color pigments onto the surface of the color filter substrate to form the R, G and B color filter layers, and an affinity of the R, G and B color pigments to the surface of the color filter substrate is stronger than that of the needles,
    wherein surfaces of the R, G and B color pigments, the color filter substrate and the needles have hydrophilicity, and the hydrophilicity of the surface of color filter substrate is stronger than that of the needles.

2. The method of claim 1, wherein the color filter layers are formed between the plurality of black matrixes on the color filter substrate.

3. A method for fabricating a liquid crystal display device comprising:
    forming a plurality of gate lines on an array substrate;
    forming a plurality of data lines to cross the plurality of gate lines on the array substrate;
    forming thin film transistors (TFTs) at each crossing of the plurality of gate lines and the plurality of data lines;
    forming a plurality of black matrixes separated at certain intervals on a color filter substrate;
    forming R, G and B color filter layers between the plurality of black matrixes on the color filter substrate by using a plurality of needles,
    wherein forming the R, G and B color filter layers comprises trapping the R, G and B color pigments by using a surface tension of the plurality of needles; and
    sequentially transferring the R, G and B color pigments onto a surface of the color filter substrate to form the R, G and B color filter layers,
    wherein each of the R, G and B color filter layers has a uniform profile height lower than a profile height of surrounding black matrixes, the black matrixes serve as a spacer to maintain a cell gap between the color filter substrate and the array substrate,
    wherein in trapping the R, G and B color pigments by using the surface tension of the plurality of needles and sequentially transferring the R, G and B color pigments onto the surface of the color filter substrate to form the R, G and B color filter layers, and an affinity of the R, G and B color pigments to the surface of the color filter substrate is stronger than that of the needles, and wherein surfaces of the R, G and B color pigments, the color filter substrate and the needles have hydrophilicity, and the hydrophilicity of the surface of color filter substrate is stronger than that of the needles; and
    forming a liquid crystal layer between the array substrate and the color filter substrate.

4. The method of claim 3, wherein the color filter layers are formed between the plurality of black matrixes on the color filter substrate.

5. The method of claim 3, further comprising:
    forming pixel electrodes that electrically connect the TFTs on the array substrates.

* * * * *